(12) United States Patent
Enge

(10) Patent No.: US 6,253,802 B1
(45) Date of Patent: Jul. 3, 2001

(54) ELECTROMECHANICALLY CONTROLLED REFUELING VALVE

(75) Inventor: Trevor L. Enge, West Bloomfield, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/322,456

(22) Filed: May 28, 1999

(51) Int. Cl.$^7$ ........................................ B65B 31/00
(52) U.S. Cl. .................... 141/59; 141/44; 141/46; 141/94; 141/95; 141/192; 141/197; 141/198; 141/285; 141/302; 123/518; 123/519; 137/588
(58) Field of Search .................... 141/44–46, 59, 141/302, 94, 95, 192, 197, 198, 285; 137/587, 588, 589; 220/86.1, 86.2, 89.1; 123/518–520

(56) References Cited

U.S. PATENT DOCUMENTS

| | | |
|---|---|---|
| 3,703,165 | 11/1972 | Hansen . |
| 4,036,255 | 7/1977 | Wilson . |
| 4,159,726 | 7/1979 | Mette . |
| 4,388,047 | 6/1983 | Mizuno et al. . |
| 4,630,749 | 12/1986 | Armstrong et al. . |
| 4,640,304 | 2/1987 | Looney . |
| 4,659,346 | 4/1987 | Uranishi et al. . |
| 4,715,509 | 12/1987 | Ito et al. . |
| 4,719,949 | 1/1988 | Mears . |
| 4,747,508 | 5/1988 | Sherwood . |
| 4,765,504 | 8/1988 | Sherwood et al. . |
| 4,781,218 | 11/1988 | Mori et al. . |
| 4,809,863 | 3/1989 | Woodcock et al. . |
| 4,821,908 | 4/1989 | Yost . |
| 4,887,578 * | 12/1989 | Woodcock et al. .................. 123/519 |
| 4,905,726 | 3/1990 | Kasugai et al. . |
| 4,926,914 | 5/1990 | Morizumi et al. . |
| 4,941,587 | 7/1990 | Terada . |
| 4,982,757 | 1/1991 | Ohasi et al. . |
| 5,012,838 | 5/1991 | Kawase et al. . |
| 5,013,887 | 5/1991 | Jervis . |
| 5,014,742 | 5/1991 | Covert et al. . |
| 5,022,433 | 6/1991 | Jansky et al. . |
| 5,027,868 | 7/1991 | Morris et al. . |
| 5,054,520 | 10/1991 | Sherwood et al. . |
| 5,054,528 | 10/1991 | Saitoh . |
| 5,065,782 | 11/1991 | Szlaga . |
| 5,099,880 | 3/1992 | Szlaga et al. . |
| 5,123,459 | 6/1992 | Toshihiro . |
| 5,220,898 | 6/1993 | Kidokoro et al. . |
| 5,234,013 | 8/1993 | Roetker et al. . |
| 5,237,934 | 8/1993 | Rhodes . |
| 5,280,775 | 1/1994 | Tanamura et al. . |
| 5,313,977 | 5/1994 | Bergsma et al. . |
| 5,379,795 | 1/1995 | Hartley et al. . |
| 5,388,611 | 2/1995 | Harris . |
| 5,413,137 | 5/1995 | Gimby . |
| 5,415,196 | 5/1995 | Bryant et al. . |
| 5,462,100 | 10/1995 | Covert et al. . |
| 5,568,828 | 10/1996 | Harris . |
| 5,582,198 | 12/1996 | Nagino et al. . |
| 5,590,697 | 1/1997 | Benjey et al. . |
| 5,669,361 * | 9/1997 | Weissinger et al. .................. 123/520 |
| 5,816,282 | 10/1998 | Hornung et al. . |
| 5,878,728 * | 3/1999 | Kidokoro et al. .................... 123/520 |

* cited by examiner

Primary Examiner—Henry J. Recla
Assistant Examiner—Timothy L. Maust
(74) Attorney, Agent, or Firm—Warn, Burgess & Hoffmann; Greg Dziegielewski

(57) ABSTRACT

An electronic onboard refueling vapor recovery (ORVR) system including an electrically operated ORVR valve that selectively opens and closes a fuel vapor path between a fuel tank and a collection canister. An electronic control circuit generates control signals to selectively open and close the ORVR valve. The electronic control circuit receives one or more inputs from one or a plurality of sensors and evaluates the one or more inputs to determine whether to activate the ORVR valve. The sensor inputs include at least a sensor indicating fuel is being introduced into the filler neck and may also include at least a sensor indicating a fuel level within the tank.

10 Claims, 6 Drawing Sheets

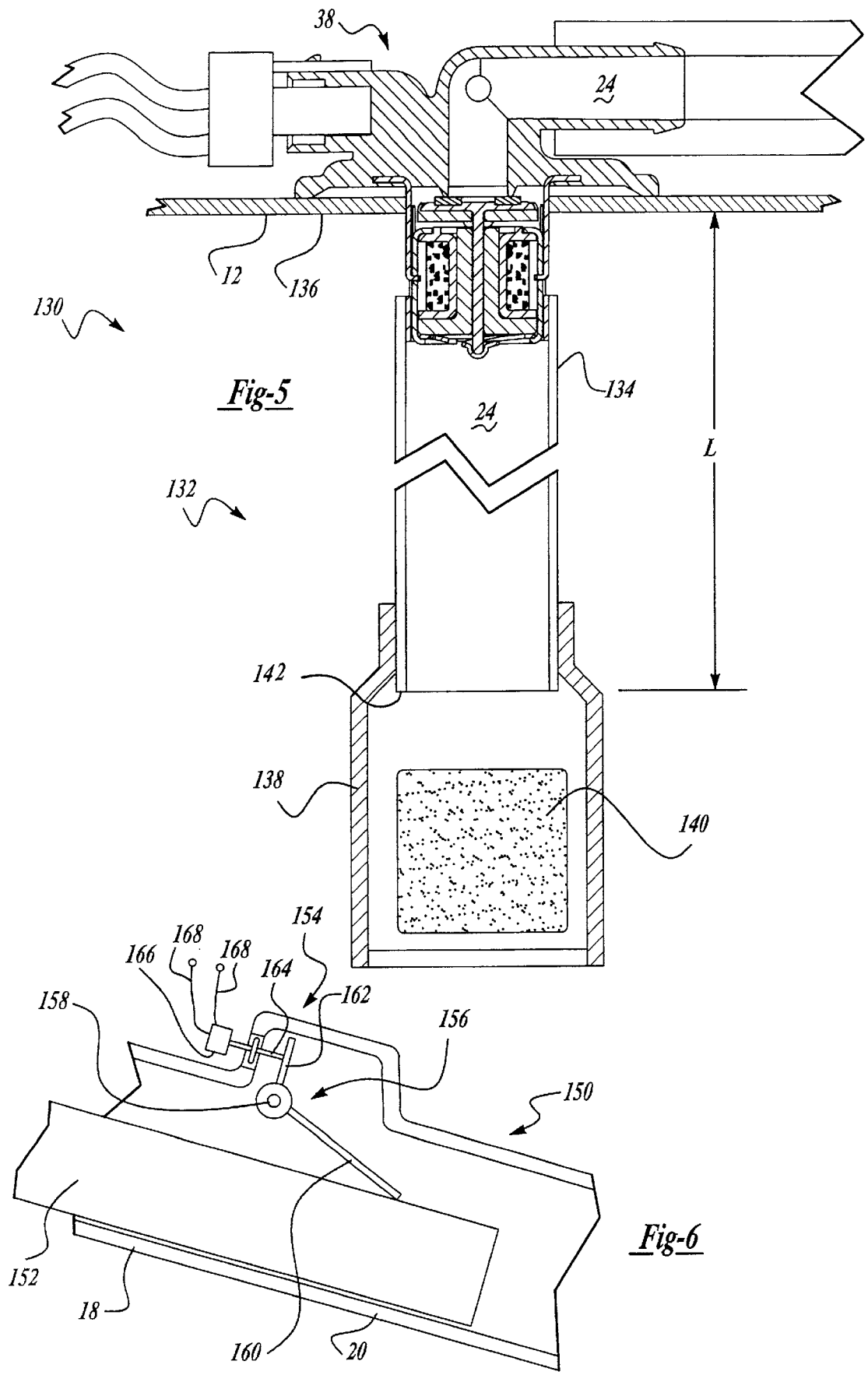

ELECTROMECHANICALLY CONTROLLED REFUELING VALVE

BACKGROUND OF THE INVENTION

1. Field of the Invention

The present invention relates to vapor recovery systems for vehicles and, more particularly, to onboard refueling vapor recovery system using an electronic control valve and a method for operating the electronic control valve.

2. Discussion

Increasingly stringent environmental standards have resulted in the passage of regulations which necessitate a significant reduction in fuel vapors escaping from a vehicle fuel tank during refueling. These regulations generally strive to essentially eliminate fuel vapor escaping to the atmosphere during refueling. The resultant emission control systems are referred to as onboard refueling vapor recovery (ORVR) systems. In an ORVR system, the filler neck of the fuel system is designed to a diameter to create a liquid seal in the filler neck to prevent vapors from escaping from the fuel tank through the filler neck. During refueling, the fuel volume within the tank increases, thereby reducing the available space for fuel vapors. The pressure created by filling the tank causes the fuel vapors to exit through an exhaust port to a fuel vapor canister. The fuel vapor canister typically includes a charcoal element to capture hydrocarbons while releasing filtered vapors into the atmosphere.

In a typical ORVR system, a control valve is placed in the vapor transmission path between the fuel tank and the canister. The primary purpose of the control valve is to enable the transmission of vapor while preventing the transmission of liquid fuel to the collection canister. If liquid fuel reaches the canister, a situation referred to as carryover, fuel can collect within the canister. Because the canister may later be purged to provide fuel to the vehicle via the intake manifold, excessive fuel carryover may cause liquid fuel to exit the fuel system or interfere with engine operation.

Existing ORVR control valves are mechanical valves which are normally open, providing a vapor path between the fuel tank and the canister. However, these normally open valves must be adaptable to close off the vapor path between the fuel tank and the canister during conditions such as vibration, slosh, and vehicle tilting which might otherwise result in a carryover condition. Typical valves include a buoyant member with a bias toward an open position. The valve is responsive to slosh, vibration, and tilting conditions to close the vapor passage. However, such valves are often slow to respond and include many moving parts which eventually deteriorate, thereby adversely affecting operation of the refueling valve.

Thus, it is an object of the present invention to provide an onboard refueling vapor recovery system having an electronic control valve to selectively enable the passage of fuel vapor from the fuel tank to the canister during predetermined conditions.

It is a further object of the present invention to provide an onboard refueling vapor recovery system having an electronic control valve which is generally closed to prevent liquid fuel from traveling to the canister, except during refueling when the electronic control valve is opened.

It is yet a further object of the present invention to provide an onboard refueling vapor recovery system having an electronic control valve and a method for controlling the electronic control valve which enables vapor to pass from the fuel tank to the canister only during predetermined conditions.

It is yet a further object of the present invention to provide a method for controlling an onboard refueling vapor recovery system having an electronic control valve, where the method prevents liquid fuel from traveling to the canister.

SUMMARY OF THE INVENTION

This invention is directed to an onboard refueling vapor recovery (ORVR) system. The ORVR system includes a fuel tank and a vapor recovery canister. A vapor passage connects the fuel tank and the vapor recovery canister. An electrically operated ORVR valve is disposed in the vapor passage. The ORVR valve enables vapor to pass between the fuel tank and canister when in an open position and prevents liquid and vapor from passing between the fuel tank and canister when in a closed position. A fill sensor detects when fuel is being introduced into the fuel tank, defined as a fueling event. The fill sensor generates a fill signal to indicate the fueling event. The ORVR valve is responsive to the fill signal and opens during a fueling event.

This invention is also directed to an onboard refueling vapor recovery (ORVR) valve. The valve includes an inlet port in communication with an interior of a fuel tank and an outlet port in communication with a canister. A passage connects the inlet port and the outlet port. A valve is disposed in the passage between the inlet and the outlet ports to selectively open and close the passage. A solenoid opens and closes the valve in accordance with an electrical signal, where the electrical signal is generated in accordance with introduction of fuel into the fuel tank. The valve is opened during the introduction of fuel into the fuel tank provided that the tank is not full.

This invention is also directed to a method for recovering vapor during an onboard refueling operation in a vehicle. The method includes providing a flow path between a fuel tank and a collection canister. The method also includes providing a fueling event sensor for detecting at least one of the introduction of fuel into the fuel tank or the introduction of a filler nozzle into a filler neck of the fuel tank, defined as a fueling event. The method further includes providing an ORVR valve in the flow path and actuating the ORVR valve in accordance with the output of the fueling event sensor to selectively open and close the flow path.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views:

FIG. 5 is a cross-sectional view of a portion of a fuel tank including a buoyant member for signaling that the fuel tank is full;

FIG. 6 is a first embodiment for a filler neck switch to indicate that a fill nozzle has been inserted into the filler neck;

DETAILED DESCRIPTION OF THE INVENTION

Figure 1:
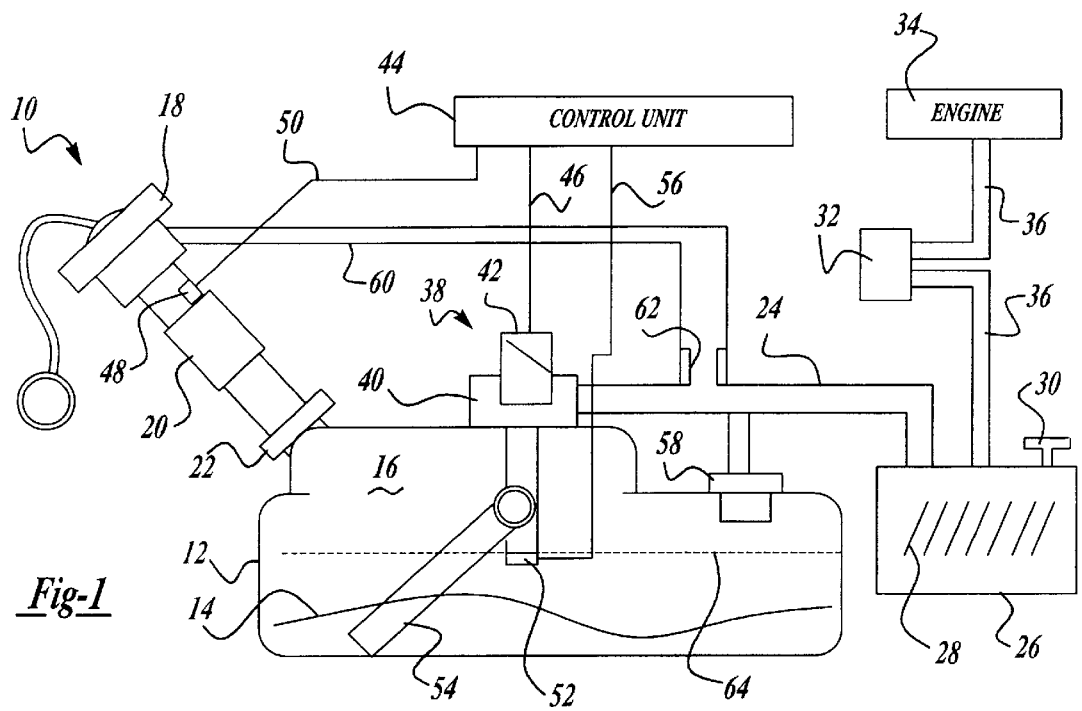
FIG. 1 is a block diagram of an onboard refueling vapor recovery (ORVR) system arranged in accordance with the principles of the present invention.

Referring to the figures generally and FIG. 1 in particular, an onboard refueling vapor recovery (ORVR) system 10 is shown. ORVR system 10 includes a fuel tank 12 which stores a volume of fuel 14. A vapor space 16 forms above fuel 14 and contains evaporated vapors from fuel 14. A filler tube 18 provides access to fuel tank 12 so that fuel 14 may be provided into fuel tank 12. Filler tube 18 includes a filler neck 20 which defines a narrowed section which interacts with a filler nozzle shown in FIGS. 6 and 8 to provide a liquid seal during refueling. A check valve 22 located downstream of filler neck 20 contains vapor and fuel within tank 12 and also prevents spitback of fuel during refueling.

A vapor passage 24 enables vapor in vapor space 16 to pass from fuel tank 12 to a canister 26. Canister 26 is typically filled with charcoal 28 to enable collection of hydrocarbons in the fuel vapor. The vapor passes through charcoal 28, where the hydrocarbons are removed, and escapes canister 26 through canister vent 30. During vehicle operation, hydrocarbons may be removed from charcoal 28 in canister 26 by providing a vacuum from the engine 34 through vacuum path 36. A canister purge valve 32 regulates the vapor flow rate through vacuum path 36.

Of particular relevance to this invention, vapor passage 24 includes an electronically controlled ORVR valve 38. ORVR valve 38 operates to selectively open and close the flow path between fuel tank 12 and canister 26, thereby enabling selective flow of vapor from fuel tank 12 to canister 26. Preferably, such flow occurs only during refueling, or in accordance with other predetermined design considerations. ORVR valve 38 includes a valve portion 40 which opens and closes vapor passage 24. ORVR valve 38 also includes an electromechanical solenoid 42, 42 receives control signals from electronic control unit 44 on signal line 46. Solenoid 42 operates valve 40 in accordance with the control signals generated by electronic control unit 44.

Electronic control unit 44 receives an input signal from a fuel filler switch 48 on signal line 50. Fuel filler switch 48 preferably emits a signal indicating that a filler nozzle of a fuel pump or can has been inserted into filler neck 20, thereby signaling a refueling event. Electronic control unit 44 also receives at least a first signal emitted by fill level sensor 52 on signal line 56. Fill level sensor 52 preferably emits a signal when the level of fuel 14 is above a predetermined threshold 64 in fuel tank 12, generally indicating that fuel tank 12 is full. Similarly, a level sender 54 outputs a signal on signal line 56 to electronic control unit 44. Level sender 54 preferably emits a variable output signal which varies in accordance with the level of fuel 14 in fuel tank 12. It should be noted that level sensor 52 and level sender 54 may be used individually or cooperatively, depending on specific design considerations.

ORVR system 10 also includes a rollover valve 58 mounted in an opening in fuel tank 12. Rollover valve 58 provides a containment function in a rollover situation and also provides a vapor flow path during a refueling event and after ORVR valve 38 has closed vapor passage 24. A recirculation line 60 interconnects vapor passage 24 to filler tube 18 at an upstream side of filler neck 20. A restrictor 62 limits vapor flow through restrictor line 60.

Figure 2:
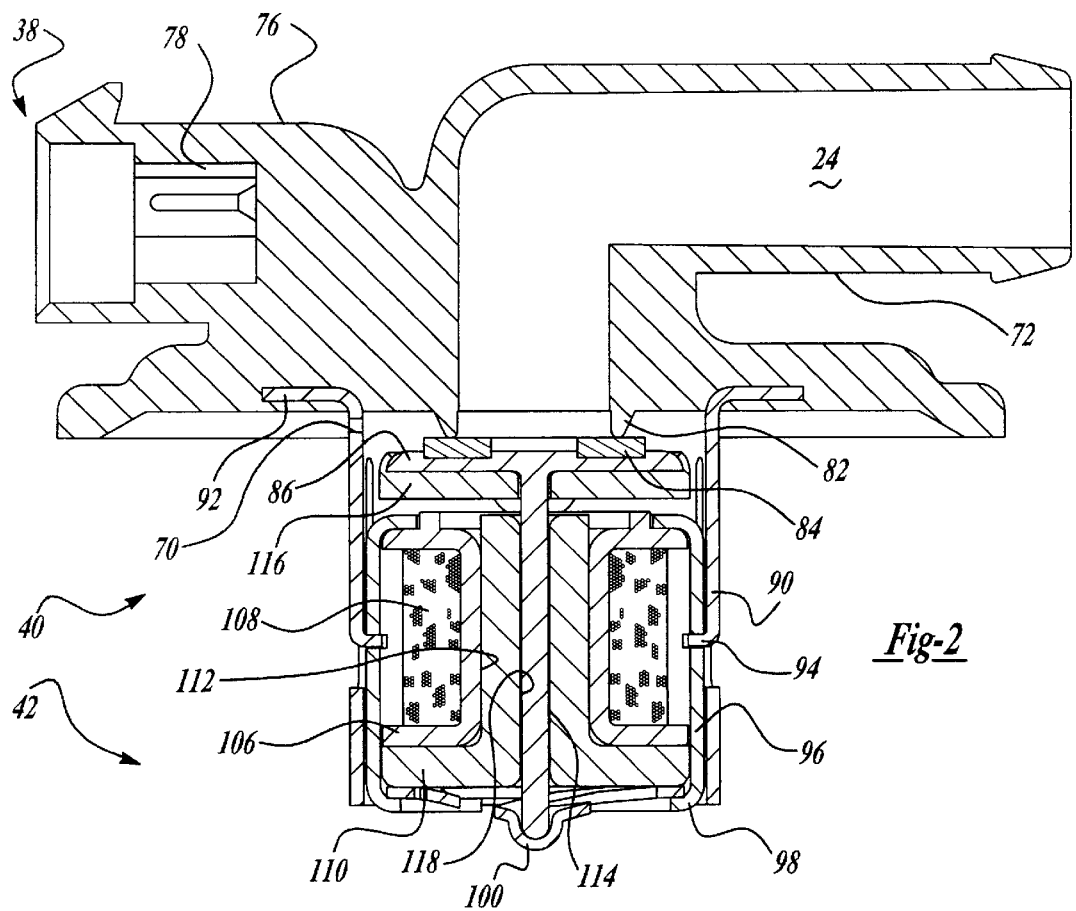
FIG. 2 is a cross-sectional view of an electronic ORVR control valve in the system of FIG. 1.

ORVR valve 38 will be described with respect to FIGS. 2–4. As shown in FIG. 2, valve 40 of ORVR valve 38 is shown in a closed position. ORVR valve 38 has an input port 70 located at a bottom portion of ORVR valve and 38 an output port 72 located in a top portion of ORVR valve 38. A bypass port 74 is formed to communicate with output port 72 and connects to bypass line 60. Output port 72 and bypass port 74 are formed in a top cover 76 which is formed of HDPE material. Top cover 76 is preferably mounted on top of fuel tank 12 so that solenoid 42 and input port 70 descend into tank 12. Top cover 76 includes an electrical connector 78 to enable power to be supplied to solenoid. Top cover 76 may also include a housing 80 formed to receive a control circuit, such as electronic control unit 44, so that ORVR valve 38 forms a generally self-contained module. Top cover 76 forms an annular valve seat 82 of valve 40. An elastomer seal 84 is selectively positioned to contact seat 82 to close vapor passage 24 or, alternatively, is displaced away from seat 82 to open vapor passage 24.

Selective opening and closing of valve 40 occurs through activation and deactivation of solenoid 42. Solenoid 42 connects to top cover 76 via an outer shell 90 which includes radial tabs 92 which molded or otherwise connected to top cover 76. Retaining outer shell 90 includes inward tabs 94 which engage an inner shell 96. Inner shell 96 includes inward tabs 98. Inward tabs 98 of inner shell 96 retain a disk spring 100 at lower portion of solenoid 42.

Solenoid 42 includes a bobbin 106 placed concentrically with and retained within inner shell 96. A coil 108 is wound upon bobbin 106. A stator 110 is inserted within a central bore 112 of bobbin 106. A shaft member 114 connects at its upper end to piston 86 and is guided by a central bore 118 in stator 110 during axial movement of piston 86 and attached shaft 114. Piston 86 is press fit within armature 116 so that movement of armature 116 causes a corresponding movement of piston 86 and elastomer seal 84, thereby opening and closing valve 40. Energization of coil 108 generates a magnetic field which exerts a generally downward force upon armature 116. Upon deenergization of solenoid 42, the generally downward force upon armature 116 dissipates, thereby enabling disk spring 100 to exert a generally upward force upon shaft member 114 and rigidly attached piston 86, thereby closing valve 40. As shown in FIG. 4, electrical connections 122 may be routed to electrical coil 108 from electrical control unit housing 80 in order to selectively actuate coil 108.

Figure 3:
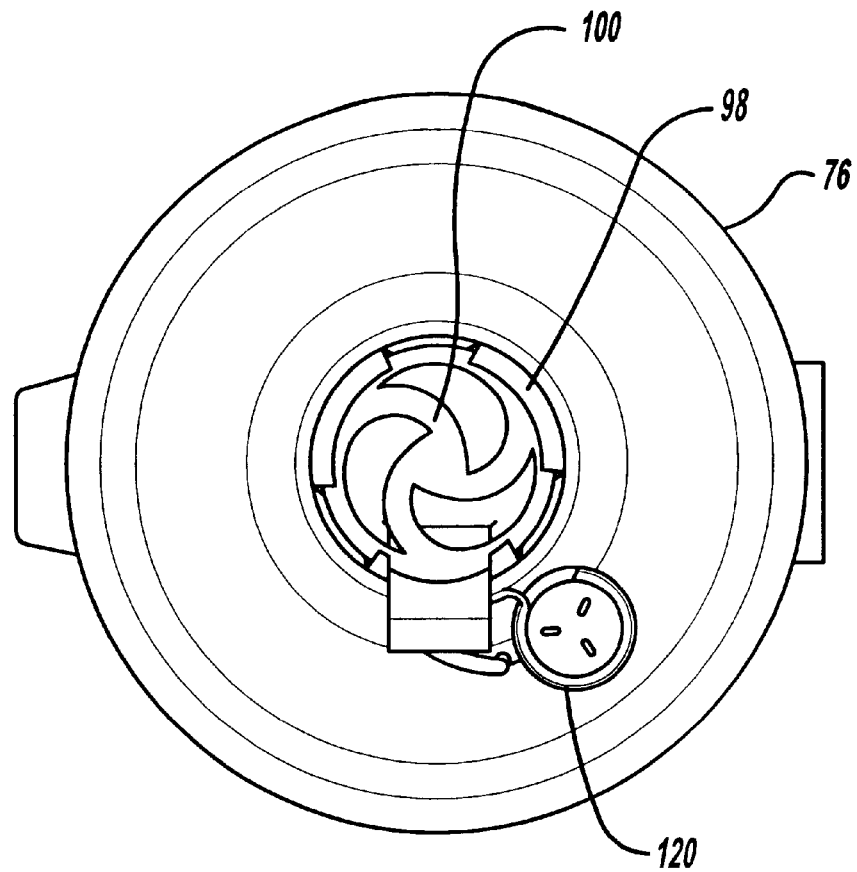
FIG. 3 is a bottom view of the ORVR control valve of FIG. 2.
Figure 4:
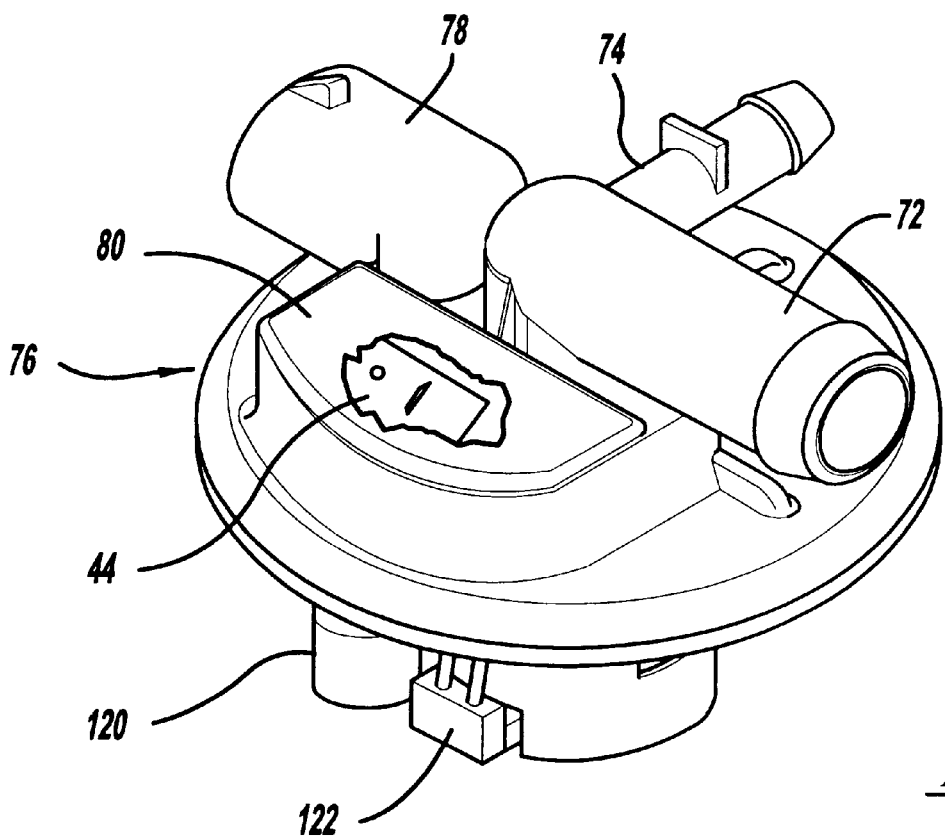
FIG. 4 is a perspective view of the top cover of the ORVR control valve of FIGS. 2 and 3.

As best seen in FIGS. 3 and 4, top cover 76 may be formed with an optional integral fill level sensor 120. Fill level sensor 120 is preferably a thermister liquid level sensor which generates a variable resistance in accordance with the sensed temperature. In operation, contact with fuel effects a temperature change up thermister 120. The temperature change varies the resistance of the thermister liquid level sensor, generally indicating that the fuel tank is full. Fill level sensor preferably is positioned within fuel tank 12 in order to provide optimum fill capacity. For example, with respect to FIG. 1, level sensor 52 may be embodied as fill level sensor 120 and may be displaced from a descending member as shown in FIG. 1.

FIG. 5 depicts a portion of an ORVR system 130 having an ORVR valve 38 placed in a vapor passage 24 which interconnects fuel tank 12 to a canister, not shown in FIG. 5. ORVR system 130 of FIG. 5 includes a mechanical level sensor 132 formed in fuel tank 12. Level sensor 132 includes a vapor passage 134 which descends from an upper surface 136 of tank 12. Level sensor 132 also includes a float portion 138 attached to a lower section of passage 134. Float portion 138 includes a buoyant member 140. Buoyant member 140 has a density that enables it to float atop fuel. Preferably, a passage 134 is sealed to top cover 76, and top cover 76 is sealed to fuel tank 12.

In operation, level sensor 132 determines the fill height of tank 12 when buoyant member 140 rises to close off passage 134. The fill height determined by level sensor 132 is determined in accordance with the length L of passage 134. When the fuel level causes buoyant member 140 to seat against the bottom surface 142 of passage 134, level sensor 132 prevents liquid fuel and fuel vapor from entering passage 134 and flowing to the canister. During a fill operation, closing passage 134 causes a resultant back-pressure to deactivate the typical fill nozzle. When the fuel height drops so that passage 134 is open, level sensor 132 enables vapor to flow into passage 134. When level sensor 132 is used in cooperation with ORVR valve 38, passage of vapor and fluid can occur only during a refueling operation as ORVR valve 38 is otherwise closed. Level sensor 132 also operates in cooperation with ORVR valve 38 to prevent sloshed fuel from flowing to the canister. Sloshed fuel correspondingly causes buoyant member 140 to rise against bottom surface 142 of passage 134, thereby preventing the sloshed fuel from entering passage 134.

In order to properly operate ORVR system 10 of FIG. 1, fuel fill switch 48 generates a signal output on signal line 50 to electronic control unit 44 to indicate that fuel may be introduced into fuel tank 12. The signal generated on signal line 50 may result from the introduction of a filler nozzle, such as from a fuel pump, to filler tube 18 and filler neck 20. Alternatively, liquid sensors may be used to detect the introduction of fuel into filler tube 18 and filler neck 20.

FIG. 6 depicts one embodiment of a mechanical switch system 150 for detecting the presence of a filler nozzle 152. Filler nozzle 152 typically is of a length to pass into filler tube 18 and filler neck 20. As shown in FIG. 6, a switch 154 includes a switch lever 156 which rotates about a pivot axis 158. Switch lever 156 includes a flapper door 160 and a contact arm 162. Switch lever 156 is generally biased, such as by a spring or other biasing means, so that flapper door 160 generally diametrically crosses filler neck 20. When filler nozzle 152 is inserted into filler neck 20, filler nozzle 152 displaces flapper door 160, causing rotational movement of switch lever 156. The rotational movement causes contact arm 162 to displace pin 164. Displacing pin 164 activates electrical switch 166.

Electrical switch 166 assumes at least two positions. In a first position, with flapper door 160 biased across filler neck 20, because no filler nozzle 152 is inserted into filler neck 20, electrical switch 166 disables continuity between electrical conductors 168. When a filler nozzle 152 is inserted into filler neck 20, thereby rotating switch lever 156 and displacing pin 164 toward electrical switch 166, electrical switch 166 enables continuity between electrical conductors 168. Enabling continuity between conductors 168 provides a signal to electronic control unit 44 of FIG. 1 that a fueling event is occurring.

Figure 7:
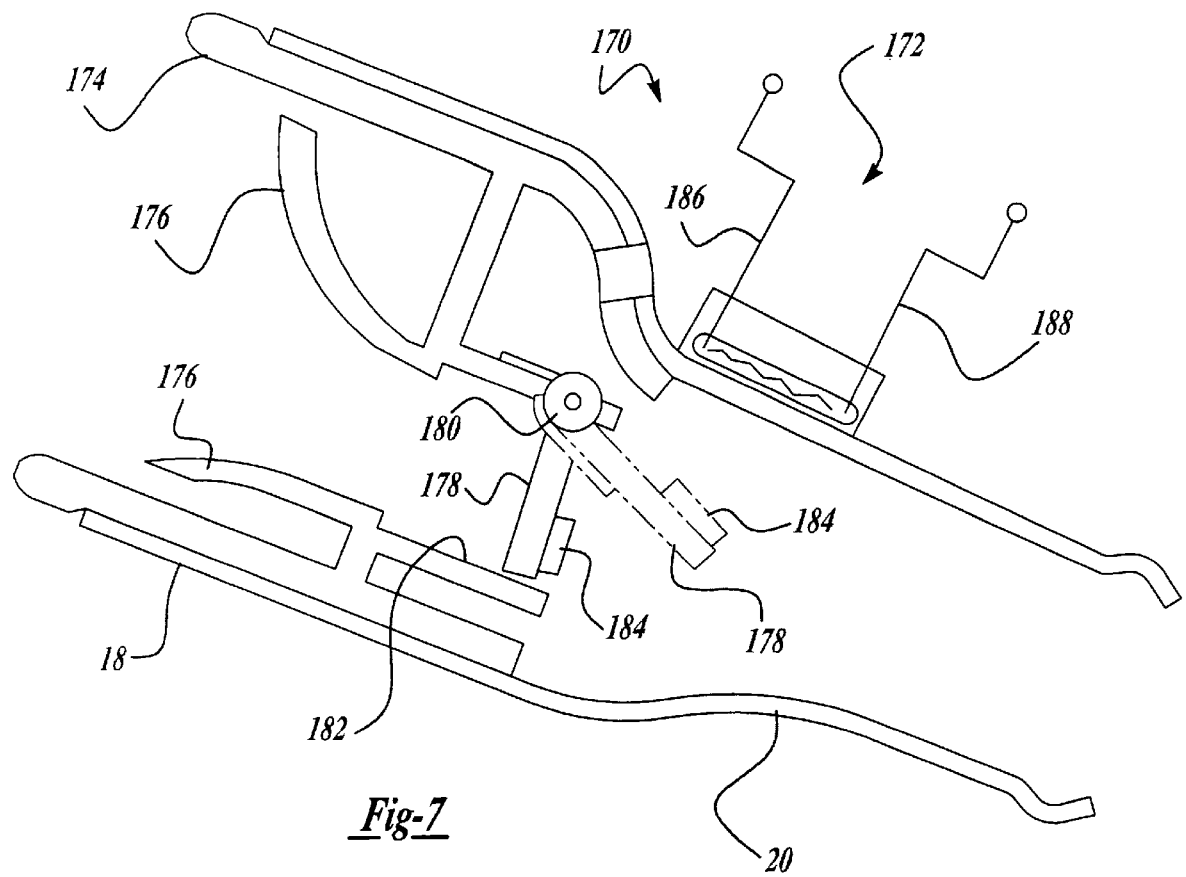
FIG. 7 is a second embodiment of a filler neck switch to indicate that a fill nozzle has been inserted into the filler neck.

FIG. 7 depicts an alternative nozzle detection system 170 utilizing a reed switch 172. The filler tube 18 includes a nozzle guide 174 which may be placed within filler tube 18. Nozzle guide 174 includes walls 176 which guide a filler nozzle, not shown in FIG. 7, downstream toward filler neck 20. Nozzle guide 174 includes a flapper door 178 which is generally biased so as to cover opening 182 of nozzle guide 174. Flapper door 178 includes a magnet 184 attached to a tank side surface of flapper door 178. When a nozzle is inserted into nozzle guide 174 so as to rotate flapper door 178 to an open position, magnet 184 actuates reed switch 172. Activation of reed switch 172 provides a conductive path between a conductor 186 and a conductor 188. When reed switch 172 is closed, the conductive path provides a signal to electrical control unit 44 of FIG. 1 indicating the occurrence of a fueling vent.

Figure 8:
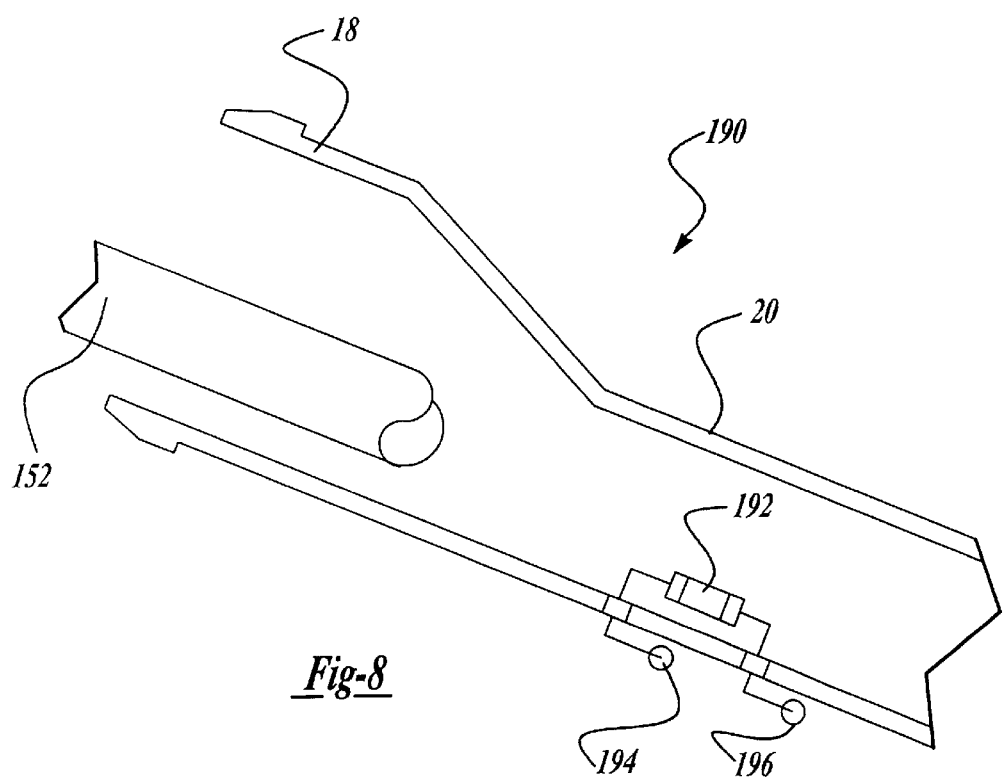
FIG. 8 is a third embodiment of a filler neck switch operable to sense the flow of fuel into the filler neck.

Rather than sensing insertion of a filler nozzle into the filler neck, other fueling detection systems can be used, including a liquid detection system. FIG. 8 depicts one embodiment of a liquid detection system 190. A thermister is placed within filler neck 20. A pair of conductors 194, 196 provides a current path through thermister 192. When fuel flows through filler neck 20, the current passing through thermister 192 changes due to variation in the resistance of thermister 192 resulting from temperature variation due to fuel flow. The change in current through thermister 192 maybe be monitored by electronic control unit 44 of FIG. 1 in order to detect introduction of fuel into fuel tank 12.

Figure 9:
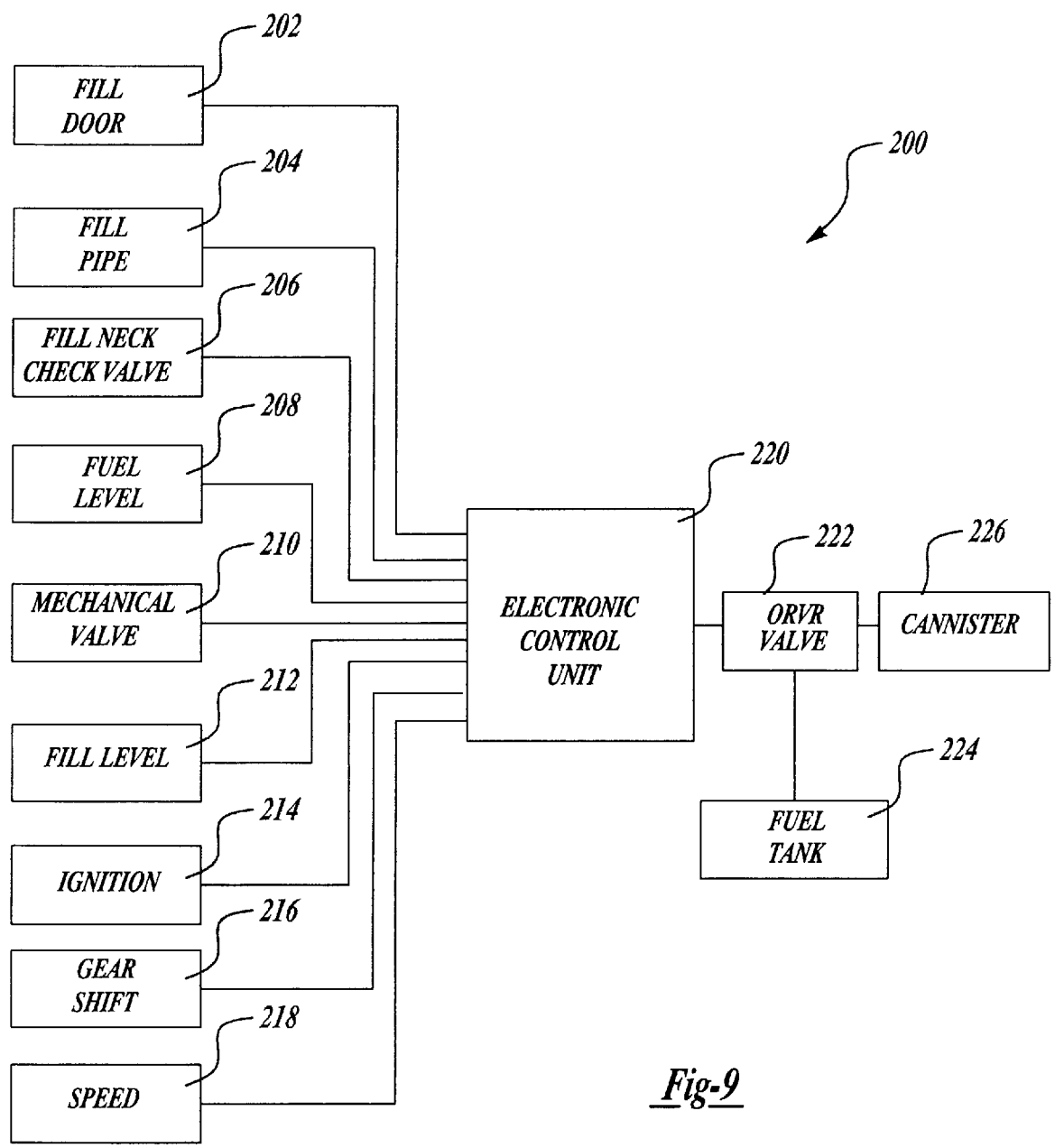
FIG. 9 is a block diagram of a second embodiment of an ORVR system.

FIG. 9 depicts a second embodiment of an ORVR system 200. The ORVR system 200 of FIG. 9 includes several sensors which generate signals input to an electronic control unit 220. The sensors include a fill door sensor 202 which generates a signal when the fuel fill door is open. A fill pipe sensor 204 and a fill neck check valve sensor 206 emit signals to electronic control unit upon detecting a filler nozzle inserted to the fill pipe. Alternatively, one or both of these sensors may be responsive to detection of fluid flowing through a fill pipe and emit a signal to electronic control unit 220 accordingly. A level sensor 208 generates a signal that varies in accordance with the fuel level within the tank. Level sensor 208 preferably emits a variable signal to electronic control unit 220 which varies in accordance with the level of fuel in the tank. A mechanical valve 210 emits an electrical signal to electronic control unit 220. Mechanical valve 210 emits a signal when fuel rises above a predetermined level, thereby tripping a mechanical element. A fill level sensor 212 operates similarly to level sensor 208, except fill level sensor 212 generates a signal when the fuel reaches a predetermined level. The signal generated by fill level sensor 212 preferably is binary signal which simply indicates that the fuel exceeds a predetermined level. Ignition sensor 214 generates an output signal to electronic control unit 220 in accordance with the state of the ignition. For example, if the ignition is activated, ignition sensor 214 outputs an appropriate electronic signal. Gearshift sensor 216 generates a variable signal to electronic control unit in accordance with the state of the vehicle gear shift. For example, gearshift sensor 216 may generate signals corresponding to park, neutral, the various forward gears, and reverse. Speed sensor 218 also generates a variable signal to electronic control unit 220, where the signal output by speed sensor 218 varies in accordance with the vehicle speed.

Sensors 202–218 generate their respective signals to electronic control unit 220. Electronic control unit 220 processes the signals in accordance with predetermined criteria and generates a signal to ORVR valve 222 to actuate ORVR valve 222 in accordance with the predetermined criteria. When actuated, ORVR valve 222 provides a vapor passage path between fuel tank 224 and canister 226. When deactuated, ORVR valve 222 closes the path between fuel tank 224 and canister 226.

Figure 10:
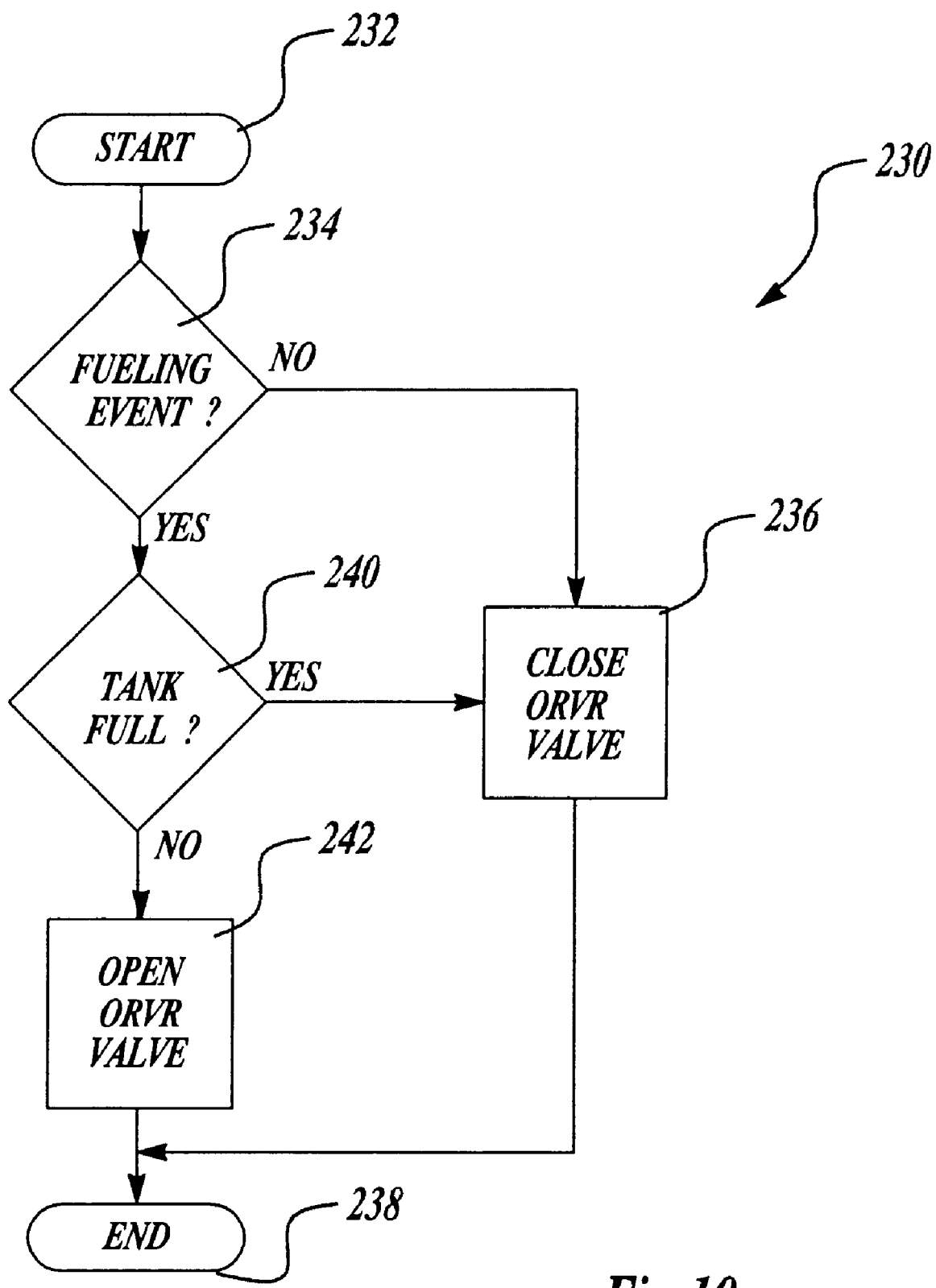
FIG. 10 is a flow chart of a method of operating an ORVR control valve.

FIG. 10 depicts a block diagram 230 for a method of operating the ORVR valves described above. The method commences at start block 232. Control proceeds from start block 232 to decision block 234. At decision block 234, a test is conducted to determine whether a filling event is occurring. A filling event may generally be described as the introduction of a filler nozzle or fuel into the fuel tank. A filling event may be detected by detecting a fuel pump fill nozzle in the filler tube 18 or filler neck 20 or may be detected by sensing fuel in filler tube 18 or filler neck 20. If no filling event is detected, control proceeds to close ORVR valve block 236. At close ORVR valve block 236, a signal is initiated to close the ORVR valve, thereby closing the vapor passage between the fuel tank and the canister. Following closure of the ORVR valve, control proceeds to end block 238.

Returning to detect filling event block 234, if a filling event is detected, control proceeds to decision block 240. At decision block 240, a test is conducted to determine if the tank liquid level sensor detects fuel at a predetermined level. For example, such a sensor may be a fill level sensor which simply determines if the level of fuel in the tank exceeds a predetermined level. Alternatively, a circuit may process a variable signal from a sending unit, such as may be used for a fuel gauge, to determine the level of fuel in the tank. If the determined level of fuel in the tank exceeds a predetermined threshold, the tank is considered full. At decision block 240 if the tank is considered full, control proceeds to close ORVR valve block 236 and then to end block 238. If the tank is determined not to be full, control proceeds to open ORVR valve block 242. At open ORVR block 242, an ORVR valve signal is sent to the ORVR valve to close the solenoid, thereby closing the passage between the fuel tank and the canister. Control then proceed to end block 238.

The foregoing system offers several benefits over existing systems. In particular, the ORVR systems described herein provide negligible fuel carryover through the control valve during any static or dynamic fuel management event. Further, the ORVR systems described herein offer improved fill quality by providing the ability to reach desired factory fill rates because the system is less susceptible to blowshut and corking. The ORVR system further offers consistent fill levels independent of the fill rate and fuel density.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. An onboard refueling vapor recovery (ORVR) system, comprising:
    a fuel tank;
    a vapor recovery canister;
    a vapor passage between the fuel tank and the vapor recover canister;
    an electrically operated ORVR valve disposed in the vapor passage, the ORVR valve enabling vapor to pass between the fuel tank and canister when in an open position and preventing liquid and vapor from passing between the fuel tank and canister when in a closed position;
    a fill sensor, the fill sensor detecting when fuel is being introduced into the fuel tank, defined as a fueling event, the fill sensor generating a fill signal to indicate the fueling event, wherein the ORVR valve is responsive to the fill signal and opens during a fueling event; and
    a level sensor, the level sensor detecting at least one fuel level within the fuel tank, the level sensor generating an electronic level signal to indicate that the fuel level within the tank is in proximity to a full level, wherein the ORVR valve is responsive to the fill and level signals for electronically closing the ORVR valve, either upon absence of a fueling event or upon receiving an electronic level signal from said level sensor.

2. The apparatus of claim 1 wherein the level sensor detects a plurality of fuel levels within the tank.

3. The apparatus of claim 1 further comprising a circuit, the circuit receiving the level signal, the circuit detecting fuel slosh in accordance with predetermined variations in the level signal, the circuit generating a control signal to close the ORVR valve when fuel slosh is detected.

4. The apparatus of claim 1 wherein the level sensor detects one fuel level, the one fuel level being set in accordance with a full fuel level.

5. The apparatus of claim 1 further comprising an electronic control unit, the electronic control unit receiving the fill signal from the fill sensor, the electronic control unit generating a control signal to actuate the ORVR valve in accordance with the fill signal.

6. The apparatus of claim 5 wherein the control unit is formed internally with the ORVR valve.

7. An onboard refueling vapor recovery (ORVR) system, comprising:
    a fuel tank;
    a vapor recovery canister;
    a vapor passage between the fuel tank and the vapor recovery canister;
    an electrically operated ORVR valve disposed in the vapor passage, the ORVR valve enabling vapor to pass between the fuel tank and canister when in an open position and preventing vapor from passing between the fuel tank and canister when in a closed position;
    a fill sensor, the fill sensor detecting when fuel is being introduced into the fuel tank, defined as a fueling event, the fill sensor generating a fill signal to indicate the fueling event, wherein the ORVR valve is responsive to the fill signal and opens during a fueling event; and
    a control circuit formed internally with the ORVR valve, the control circuit receiving the fill signal from the fill sensor, the control circuit generating a control signal to actuate the ORVR valve in accordance with the fill signal.

8. The apparatus of claim 7 further comprising a level sensor, the level sensor detecting at least one fuel level within the fuel tank, the level sensor providing a level signal to the control circuit to indicate that the fuel level within the tank is in proximity to a predetermined level, the control circuit generating a control signal to actuate the ORVR valve in accordance with the fill signal and the level signal.

9. The apparatus of claim 8 wherein the level sensor detects a plurality of fuel levels within the tank.

10. The apparatus of claim 8 wherein the level sensor detects one fuel level, the one fuel level being set in accordance with a full fuel level.

* * * * *